United States Patent
Hu

(10) Patent No.: US 10,846,083 B2
(45) Date of Patent: Nov. 24, 2020

(54) SEMANTIC-AWARE AND SELF-CORRECTIVE RE-ARCHITECTING SYSTEM

(71) Applicant: SAP SE, Walldorf (DE)

(72) Inventor: Dongqing Hu, Shanghai (CN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/217,689

(22) Filed: Dec. 12, 2018

(65) Prior Publication Data

US 2020/0192662 A1 Jun. 18, 2020

(51) Int. Cl.
*G06F 8/70* (2018.01)
*G06F 8/51* (2018.01)
(Continued)

(52) U.S. Cl.
CPC .......... *G06F 8/76* (2013.01); *G06F 8/30* (2013.01); *G06F 8/427* (2013.01);
(Continued)

(58) Field of Classification Search
CPC ..... G06F 8/51; G06F 8/76; G06F 8/73; G06F 8/38; G06F 8/40; G06F 8/64; G06F 8/65;
(Continued)

(56) References Cited

U.S. PATENT DOCUMENTS

| | | | | |
|---|---|---|---|---|
| 7,467,375 | B2 * | 12/2008 | Tondreau | G06F 8/51 717/137 |
| 8,438,551 | B2 * | 5/2013 | Tonkin | G06F 8/51 717/137 |

(Continued)

OTHER PUBLICATIONS

Lulian Neamtiu et al., Understanding Source Code Evolution Using Abstract Syntax Tree Matching, May 17, 2005, [Retrieved on Jun. 16, 2020]. Retrieved from the internet: <URL: https://dl.acm.org/doi/pdf/10.1145/1083142.1083143> 5 Pages (1-5) (Year: 2005).*

(Continued)

*Primary Examiner* — Anibal Rivera
(74) *Attorney, Agent, or Firm* — Sterne, Kessler, Goldstein & Fox P.L.L.C.

(57) ABSTRACT

Disclosed herein are system, method, and device embodiments for semantic-aware and self-corrective automatic re-architecting. An embodiment operates by determining abstract syntax trees based on source code and target code, determining method identifier information based on the abstract syntax tree of the source code, determining reference location information based on the abstract syntax tree of target code, generating updated source code based on the abstract syntax tree of the source code, and determining interface mapping information including a mapping between a first service method of the source code and a second service method of the updated service code. Some embodiments may further operate by validating the interface mapping information, and generating updated source code based on the method identifier information, the reference location information, the interface mapping information, and the abstract syntax tree of the source code.

20 Claims, 8 Drawing Sheets

(51) Int. Cl.
*G06F 8/61* (2018.01)
*G06F 9/44* (2018.01)
*G06F 8/76* (2018.01)
*G06F 8/30* (2018.01)
*G06F 8/41* (2018.01)
*G06F 16/22* (2019.01)
*G06F 8/75* (2018.01)
*G06F 8/36* (2018.01)
*G06F 8/38* (2018.01)
*G06F 8/72* (2018.01)
*G06F 8/71* (2018.01)
*G06F 8/65* (2018.01)

(52) U.S. Cl.
CPC ............ *G06F 16/2246* (2019.01); *G06F 8/36* (2013.01); *G06F 8/38* (2013.01); *G06F 8/436* (2013.01); *G06F 8/447* (2013.01); *G06F 8/51* (2013.01); *G06F 8/61* (2013.01); *G06F 8/65* (2013.01); *G06F 8/71* (2013.01); *G06F 8/72* (2013.01); *G06F 8/75* (2013.01)

(58) Field of Classification Search
CPC ..... G06F 8/36; G06F 8/72; G06F 8/71; G06F 8/74; G06F 3/04842; G06F 3/048; G06F 9/541; G06F 9/445; G06F 11/3644; G06F 21/10; G06F 8/30; G06F 8/427; G06F 8/447; G06F 8/436; G06F 8/61; G06F 8/75; G06F 16/2246
See application file for complete search history.

(56) References Cited

U.S. PATENT DOCUMENTS

| | | | | |
|---|---|---|---|---|
| 8,843,909 | B2* | 9/2014 | Tondreau, Jr. | G06F 8/45 |
| | | | | 717/103 |
| 9,411,581 | B2* | 8/2016 | Peled | G06F 8/76 |
| 9,465,608 | B2* | 10/2016 | Araya | G06F 8/447 |
| 10,061,573 | B2* | 8/2018 | Araya | G06F 8/447 |
| 10,324,695 | B2* | 6/2019 | Champagne | G06F 8/51 |
| 10,534,604 | B1* | 1/2020 | Kimball | G06F 8/72 |
| 2005/0138606 | A1* | 6/2005 | Basu | G06F 8/30 |
| | | | | 717/136 |
| 2007/0055966 | A1* | 3/2007 | Waddington | G06F 8/72 |
| | | | | 717/144 |
| 2011/0078211 | A1* | 3/2011 | Gass | G06F 9/44536 |
| | | | | 707/803 |
| 2011/0078667 | A1* | 3/2011 | Dolby | G06Q 10/10 |
| | | | | 717/133 |
| 2011/0283269 | A1* | 11/2011 | Gass | G06F 8/65 |
| | | | | 717/168 |
| 2011/0283270 | A1* | 11/2011 | Gass | G06F 8/65 |
| | | | | 717/168 |
| 2011/0296391 | A1* | 12/2011 | Gass | G06F 8/72 |
| | | | | 717/168 |
| 2014/0053285 | A1* | 2/2014 | Asadullah | G06F 21/105 |
| | | | | 726/32 |
| 2014/0067872 | A1* | 3/2014 | Kruglick | G06F 16/2365 |
| | | | | 707/797 |
| 2014/0165039 | A1* | 6/2014 | Asadullah | G06F 8/36 |
| | | | | 717/123 |
| 2015/0082290 | A1* | 3/2015 | Peled | G06F 8/51 |
| | | | | 717/137 |
| 2015/0154011 | A1* | 6/2015 | Ceng | G06F 8/51 |
| | | | | 717/137 |
| 2016/0062753 | A1* | 3/2016 | Champagne | G06F 8/51 |
| | | | | 717/137 |
| 2016/0224461 | A1* | 8/2016 | Araya | G06F 11/3644 |
| 2016/0254911 | A1* | 9/2016 | Manchepalli | H04L 9/008 |
| | | | | 713/193 |
| 2016/0291942 | A1* | 10/2016 | Hutchison | G06F 8/34 |
| 2017/0090892 | A1* | 3/2017 | Gass | G06F 9/541 |
| 2017/0220613 | A1* | 8/2017 | Gass | G06F 16/2282 |
| 2017/0293477 | A1* | 10/2017 | Takata | G06F 16/9566 |
| 2017/0344344 | A1* | 11/2017 | Gass | G06F 8/61 |
| 2018/0039490 | A1* | 2/2018 | Gass | G06F 8/427 |
| 2018/0357055 | A1* | 12/2018 | Apte | G06F 8/38 |
| 2018/0373507 | A1* | 12/2018 | Mizrahi | G06F 8/433 |
| 2019/0171433 | A1* | 6/2019 | Groseclose | G06F 8/76 |
| 2019/0243621 | A1* | 8/2019 | Gass | G06F 8/436 |
| 2019/0243629 | A1* | 8/2019 | Gass | G06F 8/64 |
| 2019/0243641 | A1* | 8/2019 | Gass | G06F 8/427 |

OTHER PUBLICATIONS

Anh Tuan Nguyen et al., Migrating Code with Statistical Machine Translation, May 31-Jun. 7, 2014, [Retrieved on Jun. 16, 2020]. Retrieved from the internet: <URL: https://dl.acm.org/doi/pdf/10.1145/2591062.2591072> 3 Pages (544-547) (Year: 2014).*

* cited by examiner

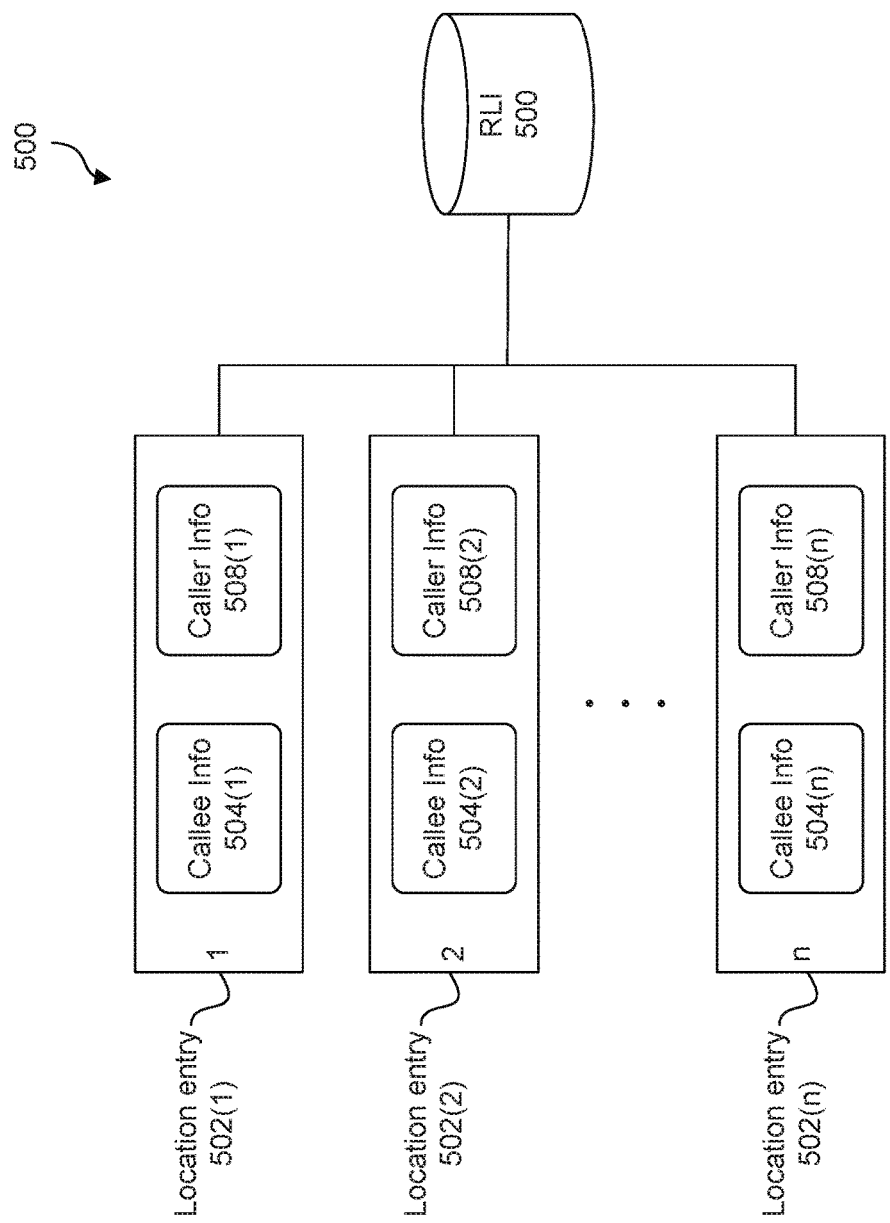

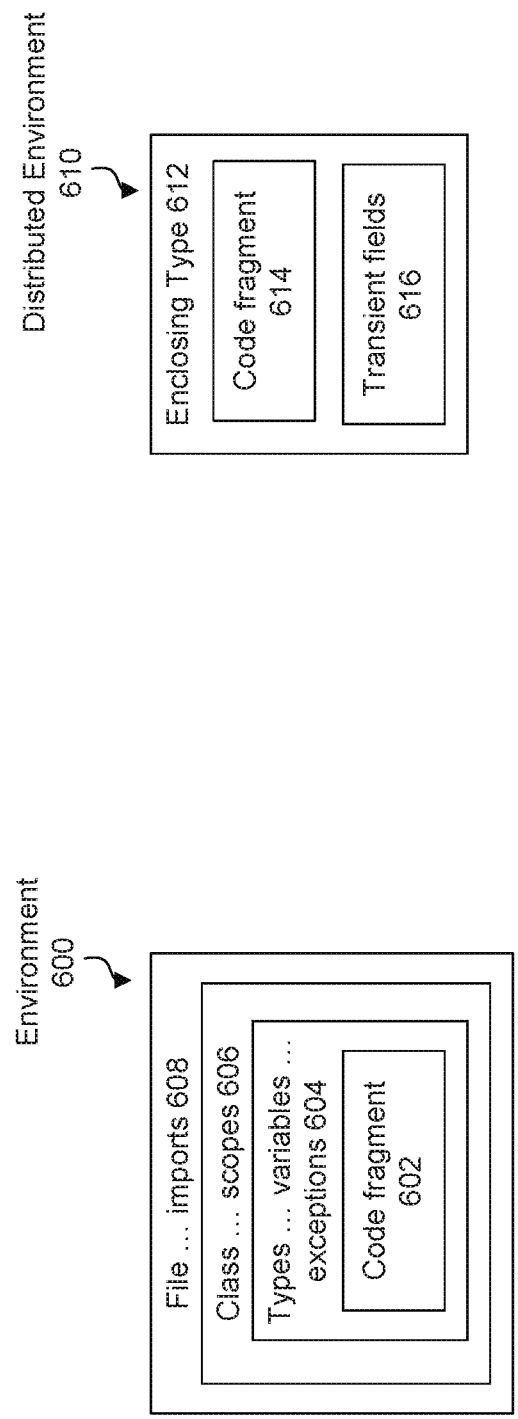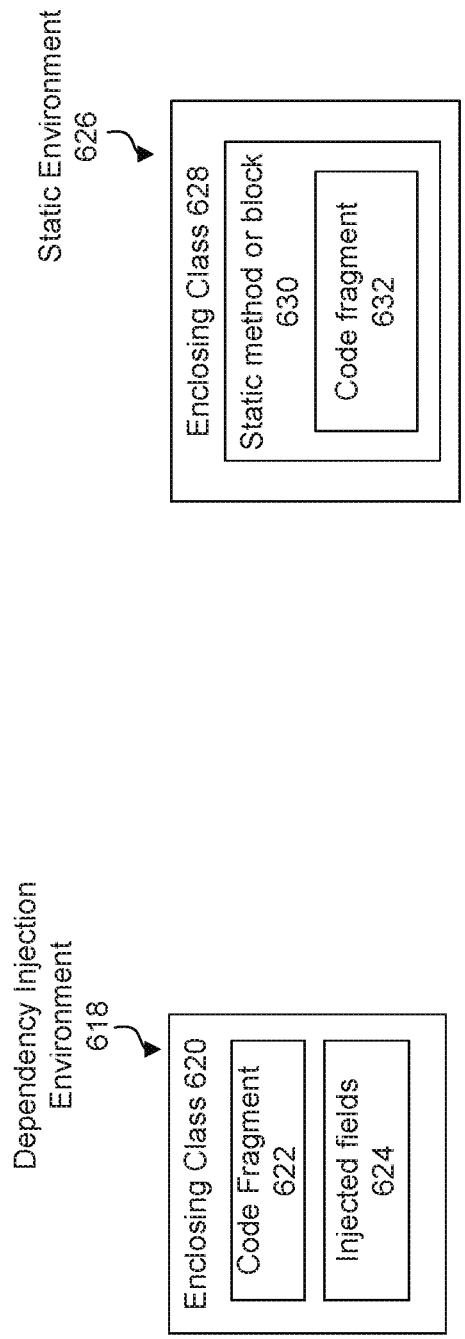
FIG. 6B
FIG. 6D
FIG. 6A
FIG. 6C

SEMANTIC-AWARE AND SELF-CORRECTIVE RE-ARCHITECTING SYSTEM

BACKGROUND

Often software developers are tasked with adopting new frameworks and/or libraries in order to meet ever changing software requirements. Typically, migrating to a new framework and/or library requires completely rewriting an existing codebase to incorporate the new framework and/or library. Many software developers currently utilize rudimentary tools that struggle with corner cases, merely assist lengthy manual rewrites, and fail to produce compilable intermediary code including original code and updated code.

BRIEF DESCRIPTION OF THE DRAWINGS

The accompanying drawings are incorporated herein and form a part of the specification.

FIG. 5 illustrates an example reference location table, according to some embodiments.

FIGS. 6A-6D illustrate example environments, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing semantic-aware and self-corrective automatic re-architecting of a software codebase.

Figure 1:
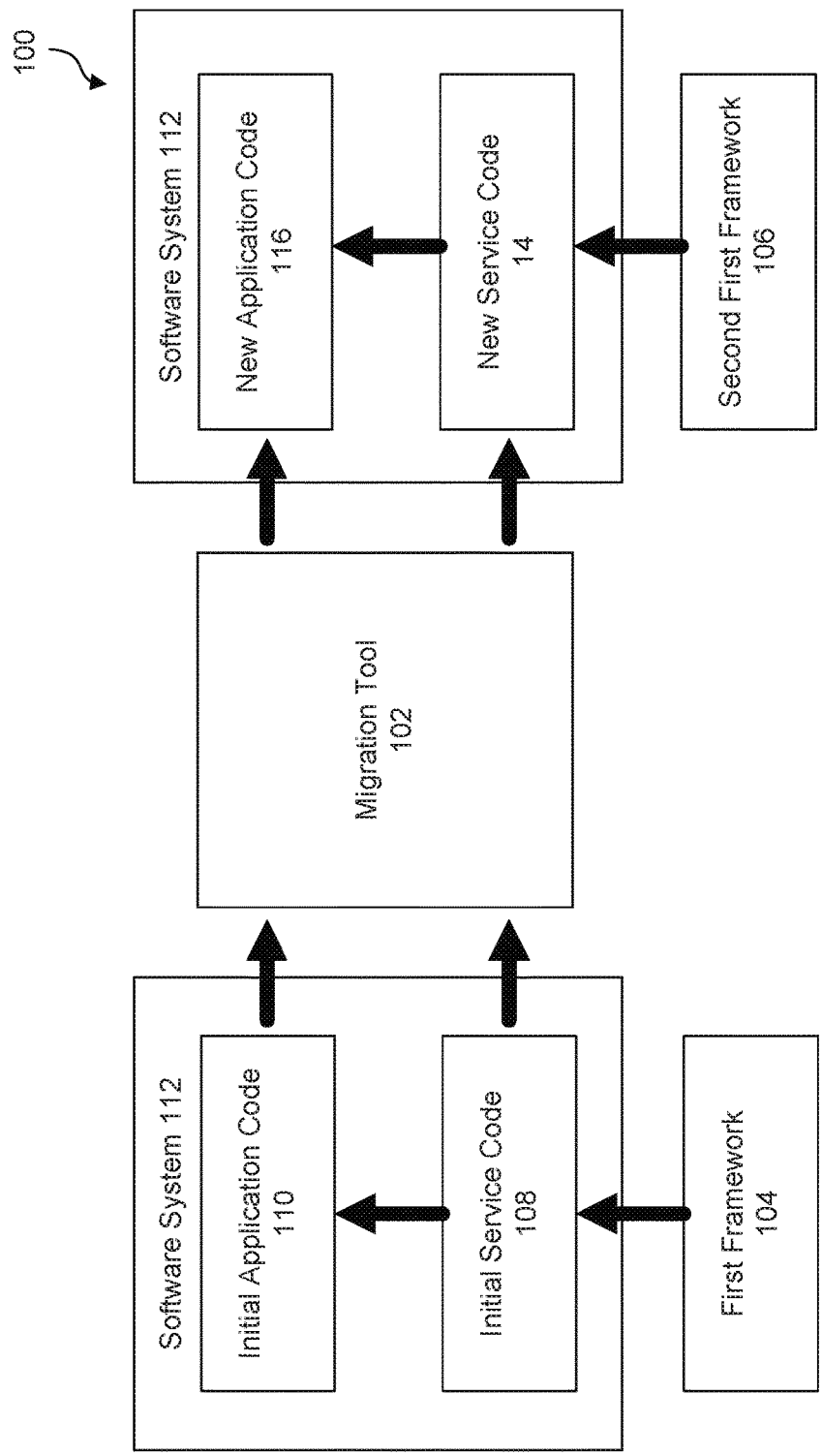
FIG. 1 is a block diagram of an example framework for implementing a semantic-aware and self-corrective re-architecting system, according to some embodiments.

FIG. 1 illustrates a block diagram of an example framework for implementing a semantic-aware and self-corrective automatic re-architecting system 100, according to some embodiments. As illustrated in FIG. 1, the re-architecting system 100 includes a migration tool 102 for re-architecting software code. As described herein, the migration tool 102 may be configured to migrate software code from a first software framework 104 to a second software framework 106. In some other embodiments, the migration tool 102 may be further configured to migrate software code from a first software library to a second software library.

As used herein, in some embodiments, a "software framework" may refer to a platform for building and deploying software applications and/or services. In some embodiments, software applications and services may rely on one or more software frameworks to implement a standard structure of application software. As such, a software framework may include predefined classes and functions that may be used to implement common functionality found across different applications and/or services. Some examples of software frameworks include web application frameworks, graphical user interface frameworks, application security frameworks, testing frameworks, web security frameworks, data access frameworks, distributed access frameworks, e-commerce frameworks, logging frameworks, cross-platform development frameworks, etc.

For example, the first software framework 104 may be an application security framework that provides authentication functionality, authorization functionality, and encryption functionality to initial service code 108 of an organization. In some embodiments, the first software framework 104, the second software framework 106, and the initial service code 108 may be developed and/or maintained by different organizations. In some other embodiments, the first software framework 104 or the second software framework 104, and the initial service code 108 may be developed and/or maintained by the same organization In addition, the organization may develop initial application code 110 that employs the initial service code 108 as a part of a software system 112. For instance, the initial application code 110 may call one or more methods/functions of the initial service code 108. In addition, code fragments of the initial service code 108 may also invoke other code fragments of the initial service code 108.

Further, the organization may endeavor to migrate the software system 112 to the second framework 106. For instance, the second framework 106 may provide secure functionality in accordance with new requirements and/or objectives of the organization. As an example, the organization may endeavor to implement a biometric authentication workflow provided by the second framework 106 that is more stringent than the password based authentication flow provided by the first framework 104.

In response, as described herein, the organization may employ the migration tool 102 to generate new service code 114 and new application code 116 based on the new service code 114. This may operate to update the security implementation within the software system 112. In some embodiments, the migration tool 102 may perform a generation run in which the migration tool 102 migrates the initial service code 108 from the first software framework 104 to the second framework 106 to generate the new service code 114. In some other embodiments, the migration tool 102 may perform a modification run in which the migration tool 102 migrates the initial application code 108 from the first software framework 104 to the second framework 106 to generate the new application code 116. In yet still some other embodiments, the migration tool 102 may perform a full run in which the migration tool 102 migrates both the initial service code 108 and the initial application code 110 from the first software framework 104 to the second framework 106 to generate the new service code 114 and the new application code 116.

As described in detail herein, in some instances, the migration tool 102 leverages abstract syntax trees and semantic analysis to provide efficiency, speed, and accuracy advantages over methods of the prior art that relied solely on text substitution or syntax-aware processing.

Figure 2:
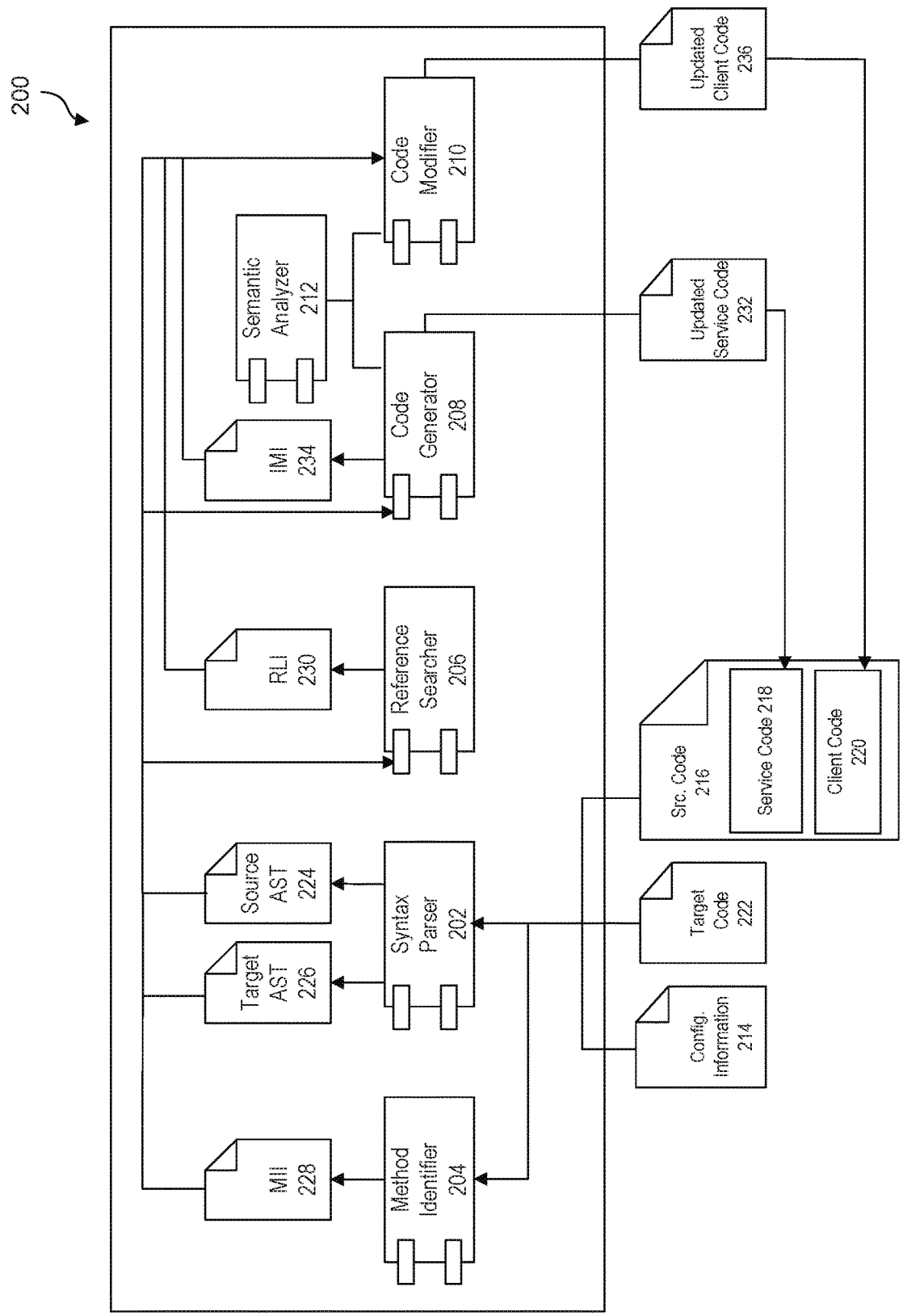
FIG. 2 is a block diagram of an example migration tool framework for implementing a semantic-aware and self-corrective re-architecting system, according to some embodiments.

FIG. 2 illustrates a block diagram of an example migration tool 200 (e.g., the migration tool 102) for implementing semantic-aware and self-corrective automatic re-architecting, according to some embodiments. As described herein, the migration tool 200 may be configured to migrate software code from a first software framework or library to a second software framework or library. As illustrated in FIG. 2, the migration tool 200 includes syntax parser 202, method identifier 204, a reference searcher 206, a code generator 208, a code modifier 210, and a semantic analyzer 212.

In some embodiments, the migration tool 200 may receive configuration information 214, source code 216 including service code 218 (e.g., the initial service code 108) and client code 220 (e.g., the initial application code 110), and target code 222 corresponding to a compilation of the source code 216. In some embodiments, the source code 216 may include one or more files, and/or file folders. Further, the source code 216 and target code 222 may correspond to one or more software applications developed or deployed using a framework or library. As used herein, in some embodiments, "service code" may refer to source code developed by an organization to provide one or more services to a codebase. As used herein, in some embodiments, "client code" may refer to source code developed that consumes the service code 216. For example, one or more code fragments of the client code may invoke methods of the service code 216.

As used herein, in some embodiments, "source code" may refer to a collection of computer instructions written using a programming language. Some examples of programming languages include Java, JavaScript, Hyper Text Markup Language (HTML), HTML5, CSS, BASIC, C, Lisp, Lua, Python, Ruby, Groovy, C, C++, C #, Visual Basic, Objective-C, Rust, and Scala. As used herein, in some embodiments, "target code" may refer to computer instructions resulting from the compilation of source code by a compiler. In some embodiments, the target code may include location information (e.g., line numbers) identifying where particular methods are invoked within the corresponding source code. In some embodiments, the source code may include Java programming instructions, and the target code may be Java virtual machine (JVM) bytecode.

The configuration information 214 may identify a location of the source code 216, a location of target code 222, or one or more execution parameters for the migration tool 200. In some embodiments, the execution parameters may include file filters. Further, a file filter may identify a file, a collection of files, a file folder, a collection of file folders, file type, and/or a collection of file types that should be ignored during a migration run performed by the migration tool 200. In some embodiments, a file filter may be defined using regular expression.

Additionally, the execution parameters may include a type of the migration run. Some examples of run types include a dry run, a generation run, a modification run, or a full run. As used herein, in some embodiments, a "dry run" may refer to the performance of a re-architecting process by the migration tool 200 that is not persisted to memory. As used herein, in some embodiments, a "generation run" may refer to the performance of a re-architecting process by the migration tool 200 to migrate the service code (e.g., the service code 218) from a first framework/library to a second framework/library. As used herein, in some embodiments, a "modification run" may refer to the performance of a re-architecting process by the migration tool 200 to migrate client code (e.g., the client code 220) from a first framework/library and first service code based on the first framework/library to a second framework/library and updated service code based on the second framework/library. As used herein, in some embodiments, a "full run" may refer to the performance of a re-architecting process by the migration tool 200 to migrate service code and client code from a first framework/library to a second framework/library. In some embodiments, a full run may comprise aspects of a generation run and a modification run. In addition, a dry run may also be a generation run, modification run, or full run.

The syntax parser 202 may be configured to generate an abstract syntax tree 224 for the source code 216 and an abstract syntax tree 226 for the target code 222. For example, the syntax parser 202 may parse the source code 216 to determine the abstract syntax tree 224 corresponding to the source code 216. As used herein, in some embodiments, an "abstract syntax tree" is a tree representation of the abstract syntactic structure of code written in a programming language. In some embodiments, an abstract syntax tree may represent the structure of programming code without punctuation, delimiters, keywords, and/or other superfluous information used for parsing text. For example, the nodes of abstract syntax tree 224 may correspond to individual programming constructs.

In some embodiments, the syntax parser 202 may include a scanner and tokenizer for pre-processing of the source code 216 prior to performance of the parsing of the source code 216. Further, in some embodiments, the syntax parser 202 may optimize the abstract syntax trees 224 and 226 for search. For example, the syntax parser 202 may index the abstract syntax tree 224 using an indexing algorithm.

The method identifier 204 may be configured to determine method identifier information 228. In some embodiments, the method identifier information 228 may include a data structure (e.g., data table, collection, etc.) including identifiers of the methods defined in the source code 216. For instance, the method identifier information 228 may be a data table including table entries storing the names of the methods defined within the service code 218. Further, in some embodiments, the method identifier information 228 may include a unique table entry for each individual method identifier within the service code 218. As such, methods within the source code 218 having the same name may be associated with the same table entry within the method identifier information 228.

The reference searcher 206 may be configured to generate reference location information 230. For instance, the reference searcher 206 may search the abstract syntax tree 226 for method references, and generate reference location information 230 identifying the location of each invocation of a method within the source code 216. For example, the reference location information 230 may be a data table. Further, the reference searcher 206 may identify invocation of a method within the abstract syntax tree 226, and generate a table entry including an identifier of the method reference and location information identifying the location within the source code 216 where the method is invoked. In some embodiments, the reference searcher 206 may search the abstract syntax tree 226 by traversing the nodes of the abstract syntax tree 226.

The code generator 208 may be configured to determine updated service code 232 based on the service code 218. In particular, the code generator 208 may identify nodes of the abstract syntax tree 224 corresponding to classes and methods of a first framework within the service code 218. Further, the code generator 208 may generate an updated abstract syntax tree 224 by replacing the identified nodes with new nodes corresponding to a second framework. In addition, the code generator 208 may generate the updated service code 232 based on the updated abstract syntax tree 224.

Also, the code generator 208 may be configured to determine interface mapping information 234. In some embodiments, interface mapping information 234 may be a data structure (e.g., data table, hashmap, collection, etc.) including a mapping of a first service method of the service code 218 to a second service method of the updated service code 232. For instance, the interface mapping information 234 may be a data table including individual table entries mapping a first service method of the service code 218 and a second service method of the updated service code 232. Further, as described in detail herein, the code generator 208 may generate the interface mapping information based on the generation of the updated service code 232.

Further, the migration tool 200 may be configured to validate the interface mapping information 234. The migration tool 200 may determine validation information and compare the validation information to the interface mapping information 234 to determine the validity of the interface mapping information 234. In some embodiments, the validation information is interface mapping information generated during a subsequent run of the migration tool 200. Further, if the validation information and the interface mapping information 234 do not match, the interface mapping information 234 is invalid and no longer corresponds to the source code 216. As such, the validation process may be employed to detect corruption of the interface mapping information 234 or stale interface mapping information 234 that no longer corresponds to the source code 216. In response to determining that interface mapping information 234 is invalid, the code generator 208 may be generate new interface mapping information 234 before performing any additional migration activity using the migration tool 200.

The code generator 208 may validate the interface mapping information 234 at the end of a generation run. Further, if the interface mapping information 234 is valid, the interface mapping information 234 may be stored for use during a subsequent modification run. In other embodiments, the code modifier 212 may validate the interface mapping information 234 at the beginning of a modification run. Further, if the interface mapping information 234 is valid, the code modifier 212 may use the interface mapping information 234 to complete the modification run.

The code generator 208 may be furthered configured to determine the updated service code 232 based on the interface mapping information 234. For example, a first method within the service code 218 may call a second method within the service code 218. As such, the code generator 208 may employ the interface mapping information 234 to determine the new service method corresponding to the second method via the interface mapping information 234. Further, the code generator 208 may replace the second method with the new service method when generating the updated service code 232.

In some embodiments, the code generator 208 may determine the updated service code 232 via custom rules. For instance, the code generator 208 may employ a custom rule set for migrating the service code 218 from a first type of software architecture to a second type of architecture. As an example, the code generator 208 may employ a custom rule set for migrating from an object oriented architecture to an event driven architecture to generate the updated service code 232. The code generator 208 may identify each service interface and its corresponding implementation class within the original service code 218. Next, the code generator 208 may generate a new class for each method within the service interface. Further, the code generator 208 may include a field for each parameter of the corresponding method within the new class. In some embodiments, the identifier of the new class may be derived from the identifier of the original method. For example, the identifier of the new class could be the same as the original class with all of the letters capitalized.

Additionally, the code generator 208 may create a handler class for each of the new classes. The handler class may include an inheritance declaration of a generic handler interface and provide generic parameters. The first generic parameter may be the event class identifier and the second generic parameter may be the return type of the original service interface method. In some embodiments, the identifier of a handler class may be derived from the identifier of the original method. For example, the identifier of the new class may be the same as the original class with the term "Handler" appended at the end. In a Java embodiment, if the return type is a primitive type, the return type may be boxed.

Further, the code generator 208 may create a "handle" method within each handler class. The "handle" method may throw an EventException. Further, the parameter of the "handle" method may be the event class, and the return type may be the second generic parameter of the handler class. The code of the "handle" method may include the implementation code of the corresponding implementation method within the implementation class. In addition, the "handle" method should consume fields of the event class instead of consuming the original parameters of the corresponding method.

As described in detail herein, the code generator 208 may further perform environment adaptation and/or exception adaptation. In addition, the code generator 208 may add entries to the interface mapping table 234 corresponding to the old service interface methods and the new service class methods. Further, the code generator 208 may update the service method invocations within the "handle" methods and perform additional environment adaptation and exception adaptation based on at least one of the interface mapping table 234 or the reference location information 230.

Table 1 presents an example of a code fragment of service code 218. Table 2 presents an example of updated service code 232 generated by the code generator 208 based on the code fragment of Table 1.

TABLE 1

```
// service interface
interface UserInterface {
    void login(String username, String password) throws EJBException;
    void register(String username, String password) throws EJBException;
}
// service implementation
class UserEJB implements UserInterface {
    void login(String username, String password) throws
    EJBException {
        Implementation code ...
    }
    void register(String username, String password) throws
    EJBException {
        Implementation code ...
    }
}
```

TABLE 2

```
// event
class Login {
    String username;
    String password;
}
// event
```

TABLE 2-continued

```
class Register {
    String username;
    String password;
}
// Generic handler interface
Interface Handler<Event, ReturnType> {
    ReturnType handle(Event event) throws EventException;
}
// the handler implementation for Login events
class LoginHandler implements Handler<Login, Void> {
    Void handle(Login login) throws EventException {
        Implementation code ...
    }
}
// the handler implementation for Register events
class RegisterHandler implements Handler<Register, Void> {
    Void handle(Register register) throws EventException {
        Implementation code ...
    }
}
```

As another example, the code generator 208 may employ a custom rule set for migrating the service code 218 from a first framework to a second framework. For instance, the code generator 208 may employ a custom rule set for generating the updated service code 232 based on migrating from the Enterprise Java Beans (EJB) framework to the Spring Framework. The code generator 208 may identify each service interface and its corresponding implementation class within the original service code 218. Next, the code generator 208 may generate a copy of each implementation class. For an individual copied class, the code generator 208 may replace "EJB" with "Service" within the identifier of the class. Further, the code generator 208 may remove the interface inheritance declaration, and replace "EJBException" with "ServiceException" in the "throws" declaration of the methods of the copied classes.

As described in detail herein, the code generator 208 may further perform environment adaptation and/or exception adaptation. In addition, the code generator 208 may add entries to the interface mapping table 234 corresponding to the old service interface methods and the new service class methods. Further, the code generator 208 may update the service method invocations within the newly created methods and perform additional environment adaptation and/or exception adaptation based on at least one of the interface mapping table 234 or the reference location information 230.

Table 3 presents an example of a code fragment of service code 218. Table 4 presents an example of updated service code 232 generated by the code generator 208 based on the code fragment of Table 3.

TABLE 3

```
// service interface
interface UserInterface {
    void login(String username, String password) throws EJBException;
    void register(String username, String password) throws EJBException;
}
// service implementation
class UserEJB implements UserInterface {
    void login(String username, String password) throws EJBException {
        Implementation code ...
    }
    void register(String username, String password) throws EJBException {
        Implementation code ...
    }
}
```

TABLE 4

```
// service class without separate interface
class UserService {
    void login(String username, String password) throws ServiceException {
        Implementation code ...
    }
    void register(String username, String password) throws ServiceException {
        Implementation code ...
    }
}
```

The code modifier 210 may be configured to determine updated client code 236 based on the abstract syntax tree 224, the method identifier information 228, the reference location information 230, and the interface mapping table 234. In some embodiments, the code modifier 210 may cross analyze the source code 216 and the target code 222 to determine which methods are called within the client code 220. For example, the code modifier 210 may identify invocation of the passwordLogin method within the source code 216 via the abstract syntax tree 224. Further, the code modifier 210 may search the method identifier information 228 to determine whether the passwordLogin method is defined within the service code 218. Additionally, the code modifier 210 may use the reference location information 230 to distinguish the invocation of the passwordLogin method within the service code 218 from other methods within the service code 218 having a similar name and/or identifier.

Further, the code modifier 210 may determine the service calls of the updated service code 232 to include in the updated client code 236 based on the interface mapping table 234. For instance, the code modifier 210 may determine that the passwordLogin method has been replaced with a biometricLogin method within the updated service code 232 based on the interface mapping table 234. Additionally, the code modifier 210 may determine an updated abstract syntax tree 224 by replacing the node corresponding to the passwordLogin method with a node corresponding to the biometricLogin method. Once the code modifier 210 has determined the updated syntax tree 224 based on the identified methods and the interface mapping table 234, the code modifier 210 may generate the updated client code 236 based on the updated syntax tree 224.

The migration tool 200 may perform batch processing of the source code 216. For instance, the migration tool 200 may perform a generation run to determine the updated service code 232 and the interface mapping information 234. Next, the migration tool 200 may separately perform a modification run to determine the updated client code 236 using the previously determined updated service code 232 and interface mapping information 234. In other embodiments, the migration tool 200 may determine the updated service code 232 and/or the updated client code 236 by organizing the source code 216 into smaller batches of code, and sequentially processing the batches. For example, the migration tool 200 may split the service code 218 into batches of code. Further, the migration tool 200 may perform a first generation run on the first batch of source code 216 to determine the first batch of updated service code 232. Upon completion of the generation run on the first batch of source code 216, the migration tool 200 may perform code driven tests (e.g., unit tests, integration tests, etc.) on the updated service code 232 associated with the first batch of source code 216. Additionally, in response to the first batch of the source code 216 passing the code driven tests, the migration tool 200 may store the updated service code 232. For example, the migration tool 200 may check the updated service code 232 into a code repository that manages version control of the source code 216. In some embodiments, storing the updated service code 232 may incorporate the updated service code 232 into the source code 216.

In addition, the migration tool 200 may subsequently perform subsequent generation runs on the other batches of service code 218 until all of the service code 218 is migrated to the new framework. Similarly, the migration tool 200 may split the client code 220 into batches of code, and perform sequential modification runs over the batches until the client code 220 is migrated to the new framework.

In some embodiments, a run may include a predetermined batch threshold. For example, the migration tool 200 may suspend a run after migrating a predetermined amount of files of source code 216 to the new framework. In addition, when the migration tool 200 performs the next run, the migration tool 200 may automatically restart the migration process at the point the migration process was previously suspended.

The code generator 208 and/or the code modifier 210 may employ the semantic analyzer 212 to assist with environment adaptation and exception adaptation. In particular, the semantic analyzer 212 may determine that the code generator 208 or code modifier 210 should adapt the environment of a code fragment when determining updated service code 232 or updated client code 236, respectively.

As used herein, in some embodiments, an "environment" includes at least the context of a code fragment. In some instances, the environment may include imports, variables, types, scopes, exceptions, and etc. Further, the environment of a code fragment may indicate one or more steps that should be performed by the code generator 208 or the code modifier 210 to migrate the source code 216. When generating or modifying the source code 216, the new code (i.e., the updated service code 232 and the updated client code 236) may depend on elements (e.g., imports, variables, exceptions, etc.) which are not present in any of the enclosing scopes. As such, the migration tool 200 may adapt the environment of the new code by adding the elements to the new code.

In some embodiments, an environment can be categorized into an environment type. Some examples of an environment type include a distributed environment, an inversion of control (IoC) container environment, and a static environment. In some instances, an environment may be categorized as multiple environment types at the same time.

The semantic analyzer 212 may be configured to identify an environment type associated with a code fragment within the source code 216 using heuristic semantic analysis. The semantic analyzer 212 may identify the environment type based upon a method declaration or type declaration corresponding to the code fragment. For instance, the semantic analyzer 212 may identify an enclosing class that includes the code fragment, and determine a supertype of the enclosing class. Further, the semantic analyzer 212 may determine an environment type of the code fragment based upon the supertype. As used herein, in some embodiments, a "supertype" is a class or interface that has been extended or implemented directly or indirectly by a class or interface of another type.

In some other instances, the semantic analyzer 212 may identify an enclosing method or class that includes the code fragment, and determine a modifier associated with the enclosing method or class. Further, the semantic analyzer 212 may determine an environment type of the code fragment based upon the modifier. As used herein, in some embodiments, a "modifier" is a programming keyword that may be added to the definition of a class, method, or variable to modify the meaning of the respective class, method, or variable. Some examples of a modifier include final, static, abstract, synchronized, public, private, and protected.

In some other instances, the semantic analyzer 212 may identify an enclosing method or class that includes the code fragment, and determine an annotation associated with the enclosing method or class. Further, the semantic analyzer 212 may determine an environment type of the code fragment based upon the annotation. As used herein, in some embodiments, an "annotation" is a form of syntactic metadata that can be added to source code. Further, in some embodiments, annotations may provide instructions to the compiler. In some examples, one or more of the annotations may be provided by the programming language of the code fragment.

In yet still some other instances, the semantic analyzer 212 may identify an enclosing class that includes the code fragment, and determine that a member of the enclosing class is associated with a particular modifier or annotation. Further, the semantic analyzer 212 may determine an environment type of the code fragment based upon the modifier or annotation.

As described above, one example of an environment type is a distributed environment. In a distributed environment, an instance of the enclosing type may be serializable. As such, the instance may have its state converted to a bytestream (i.e., serialized) that can be reverted back into a copy of the instance (i.e., deserialized). In some embodiments, the migration tool 200 may determine that an environment is a distributed environment if the enclosing type inherits the java.io.Serializable interface. In addition, the migration tool 200 may avoid adding non-transient fields to this type. Instead, the migration tool may add transient fields or local variables to this type.

As described above, another example of an environment type is an IoC/Dependency Injection (DI) container environment. In an IoC container environment, an instance of the enclosing type may be managed by an IoC container in a software system. As used herein, in some embodiments, IoC is a process wherein objects define their dependencies. Further, in some embodiments, an "IoC container" is a container that may manage injection of the dependencies. In some instances, the migration tool 200 may determine that an environment is an IoC container environment if the enclosing type has a @Named annotation or one of the members of the enclosing type has a @Inject annotation. In addition, the migration tool 200 may add fields with the @Inject annotation to this type.

As described above, another example of an environment type is a static environment. In a static environment, an instance of the enclosing structure may be a static area. For instance, an enclosing method of a code fragment may be a static method. In some embodiments, the migration tool 200 may determine that an environment is a static environment if the enclosing method has a @Static annotation. In addition, the migration tool 200 may avoid adding fields to an enclosing type in a static environment. Instead, the migration tool 200 may add local variables to the enclosing type.

In some embodiments, exception adaptation may be considered a form of environment adaptation. As such, the semantic analyzer 212 may be configured to manage the presence of exceptions within the updated service code 232 or the updated client code 236. In some programming languages, an exception within a method that is checked at compile time must be handled within the method or the method must specify the exception (e.g., a Java method may specify the exception with the throws keyword). Otherwise, the source code including the checked exception will not be able to compile. As such, in some embodiments, when the migration tool 200 replaces old calls associated with old exceptions, the migration tool 200 may also perform exception adaptation to ensure proper handling of checked exceptions within the source code 216.

For example, the passwordLogin method of the old source code 216 may throw an AlphaException and a BetaException. Further, the biometricLogin method may throw an AlphaException and a GammaException. In addition, the migration code generator 208 may replace the passwordLogin method with the biometricLogin method to generate the updated service code 232.

Table 5 presents an example of a code fragment of client code 220 that invokes the passwordLogin method and includes exception handling logic for the AlphaException and the BetaException associated with the passwordLogic method.

TABLE 5

```
try {
    passwordLogin( );
} catch(AlphaException e) {
    handle(e);
} catch (BetaException e) {
    handle(e);
}
```

Table 6 presents an example of a code fragment of client code 220 that has been modified so that the biometricLogin method of the updated service code 232 replaces the passwordLogin method of the initial service code 218. As shown in Table 2, the migration tool 200 has not removed the exception handling corresponding to passwordLogin method. As such, the code fragment would not compile because the code fragment includes exception handling logic for BetaException which is not thrown by the biometricLogin method, and fails to include exception handling logic for GammaException which is thrown by the biometricLogin method.

TABLE 6

```
try {
    biometricLogin( );
} catch(AlphaException e) {
    handle(e);
} catch (BetaException e) {
    handle(e);
}
```

Table 7 presents an example of a code fragment of the updated client code 236 that invokes the biometricLogin method and includes exception handling logic for the exceptions (i.e., AlphaException and GammaException) associated with the biometricLogin method.

TABLE 7

```
try {
    passwordLogin( );
} catch(AlphaException e) {
    handle(e);
} catch (GammaException e) {
    handle(e);
}
```

In some embodiments, the code generator 208 may perform a copy operation in response to an instruction from the semantic analyzer 212 to perform an exception adaption. During a copy operation, the code generator 208 or the code modifier 210 may modify the exception handling logic (e.g., try-catch clause) of an old exception in the source code 216 by substituting a new exception for the old exception within the exception handling logic placed into the generated or modified source code 216 (i.e., the updated service code 232 or the updated client code 236).

For instance, a code fragment of the service code 218 may include the passwordLogin method and exception handling logic for the BetaException. Further, the semantic analyzer 212 may determine that the environment of the code fragment should be adapted based upon the relationship between the passwordLogin method and the BetaException and/or the presence of the exception handling logic for the BetaException. In addition, when determining the updated service code 232, the code generator 208 may copy the exception handling logic for the BetaException into the updated service code 232 and replace reference to the BetaException within the exception handling logic with a reference to the GammaException.

In some embodiments, the code generator 208 may perform a de-duplication operation in response to an instruction from the semantic analyzer 212 to perform an exception adaption. During a de-duplication operation, the code generator 208 or code modifier 210 may identify that first exception handling logic for a first exception is formally equivalent to second exception handling logic for a second exception, and remove the first exception handling logic or the second handling logic when determining the updated service code 232 or the updated client code 236, respectively. By removing one of the first exception handling logic or the second handling logic, the migration tool 200 is ridding the updated service code 232 or the updated client code 236 of redundant code.

As used herein, in some embodiments, first exception handling logic may be "formally equivalent" with second exception handling logic when the first exception handling logic and the second exception logic can be regarded as equivalent even though they are not identical. For instance, if a code fragment of client code 220 includes separate exception handling logic for an Alpha Exception and a GammaException even though the GammaException is a subclass of the AlphaException, the code modifier 210 may remove the exception handling logic for one of the GammaException or AlphaException when determining the updated client code 236.

The code generator 208 may perform a disguise operation in response to an instruction from the semantic analyzer 212 to perform an exception adaption. For example, the semantic analyzer 212 may determine that a code fragment does not include exception handling logic for an old exception but the method enclosing the code fragment throws an old exception. In response, the semantic analyzer 212 may instruct the migration tool 200 to perform a disguise operation. During a disguise operation, the code generator 208 or code modifier 210 may wrap a new exception within an old exception, and throw the old exception within the exception handling logic.

Table 8 presents an example of an old service call within the source code 216 that is enclosed within a method that throws an OldException. In some embodiments, modifying the method signature of the enclosing method may cause compilation errors. As such, the code generator 208 or the code modifier 210 may be configured to perform a disguise operation.

TABLE 8

```
public void enclosingMethod( ) throws OldException {
    passwordLogin( );
}
```

Table 9 presents an example of the result of performing a disguise operation on an environment when performing a migration from an older service call to a new service call to determine the updated service code 232 or updated client code 236. In particular, the call to the passwordLogin method within the code fragment has been replaced with a call to the biometricLogin method. Further, the exception handling logic has been modified so that the old exception is wrapped within the exception handling logic for the new exception.

TABLE 9

```
public void enclosingMethod( ) throws OldException {
    try {
        biometricLogin( );
    }catch (catch NewException e) {
        throw new OldException(e);
    }
}
```

Figure 3:
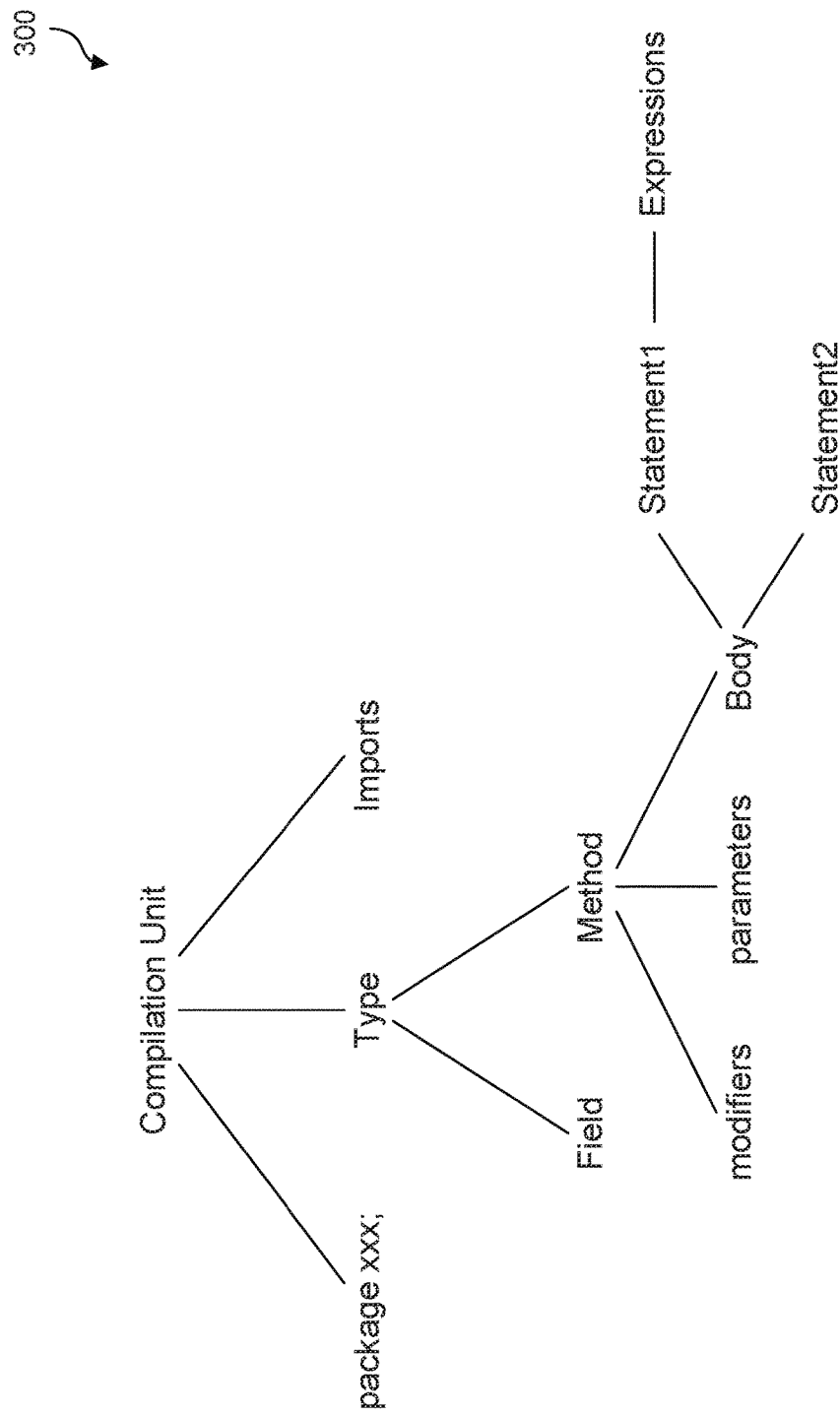
FIG. 3 illustrates an example abstract syntax tree, according to some embodiments.

FIG. 3 illustrates an example abstract syntax tree 300, according to some embodiments. As illustrated in FIG. 3, the abstract syntax tree 300 may include one or more branches and one or more leaves. Further, as described in detail above, the leaves of the abstract syntax tree correspond to programming constructs found in source code (e.g., the source code 216).

Figure 4:
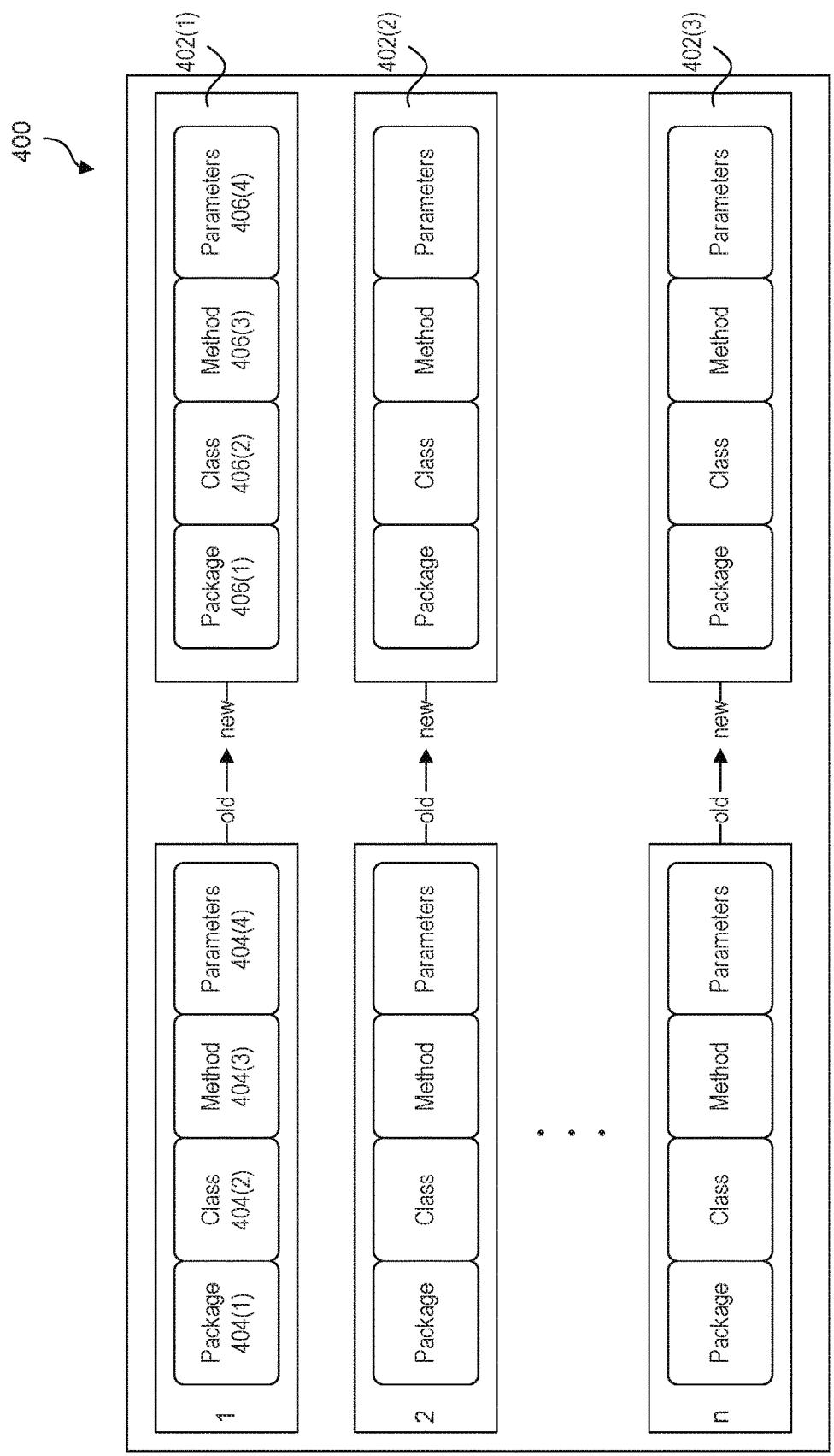
FIG. 4 illustrates an example interface mapping table, according to some embodiments.

FIG. 4 illustrates an example interface mapping table 400 (e.g., interface mapping table 234), according to some embodiments. As illustrated in FIG. 4, the interface mapping table 400 may include a plurality of table entries 402(1)-(n). Further, each table entry may map a representation of a first service declaration 404 of old service code (e.g., the service code 218) to a representation of a second service declaration 406 of new service code (e.g., the updated service code 232). In some embodiments, as described in detail herein, the first service declaration 404 may be replaced with the second service declaration 406 during code generation performed by a code generator (e.g., the code generator 208) to determine updated service code (e.g., the updated service code 232). In addition, when performing the code modification, a code modifier may replace a call to the method associated with the first service declaration 404 with a call to the method associated with the second service declaration 406 to determine updated client code (e.g., the update client code 236)

As illustrated in FIG. 4, the representation of the first service declaration 404 may include the package 404(1) of the first service declaration 404, the class 404(2) of the first service declaration 404, the method 404(3) of the first service declaration 404, and the parameters 404(4) of the first service declaration 404. In addition, the representation of the second service declaration 406 may include the package 406(1) of the second service declaration 406, the class 406(2) of the second service declaration 406, the method 406(3) of the second service declaration 406, and the parameters 406(4) of the second service declaration 406.

FIG. 5 illustrates an example reference location table 500 (e.g., reference location table information 230), according to some embodiments. As illustrated in FIG. 5, the reference location table 500 may include a plurality of table entries 502(1)-(n). Further, each table entry may associate a location 504 within source code (e.g., the source code 216) to callee information 506 and caller information 508.

For example, the first location entry may map a first location 504(1) to callee information 506(1) and first caller information 508(1). Further the first callee information 506(1) may include information about a service method invoked at the first location 504(1) within source code. In addition, the first caller information 508(1) may include information about the invocation of the service method at the first location 504(1). As described herein, in some embodiments, the interface mapping table 500 may be used by a migration tool (e.g., the migration tools 102, and 200) to distinguish between service methods invoked within source code.

FIGS. 6A-6D illustrate example environments, according to some embodiments. FIG. 6A illustrates an environment 600 including a code fragment 602. Further, a semantic analyzer (e.g., the semantic analyzer 212) may determine one or more environment types of the environment 600, and one or more environment adaption steps to perform based on types, variables and exceptions 604 within the environment 600, a scope 606 of a class defined within the environment 600, or imports 608 associated with a file corresponding to the environment 600.

FIG. 6B illustrates a distributed environment 610 including an enclosing type 612. Further, as described herein, the enclosing type 612 may include a code fragment 614 and one or more transient fields 616. FIG. 6C illustrates an IoC/DI environment 618 including an enclosing class 620. Further, as described herein, the enclosing class 620 may include a code fragment 622 and one or more injected fields 624. FIG. 6D illustrates a static environment 626 including an enclosing class 628. Further, as described herein, the enclosing class 628 may include a static method or block 630 including a code fragment 632.

Figure 7:
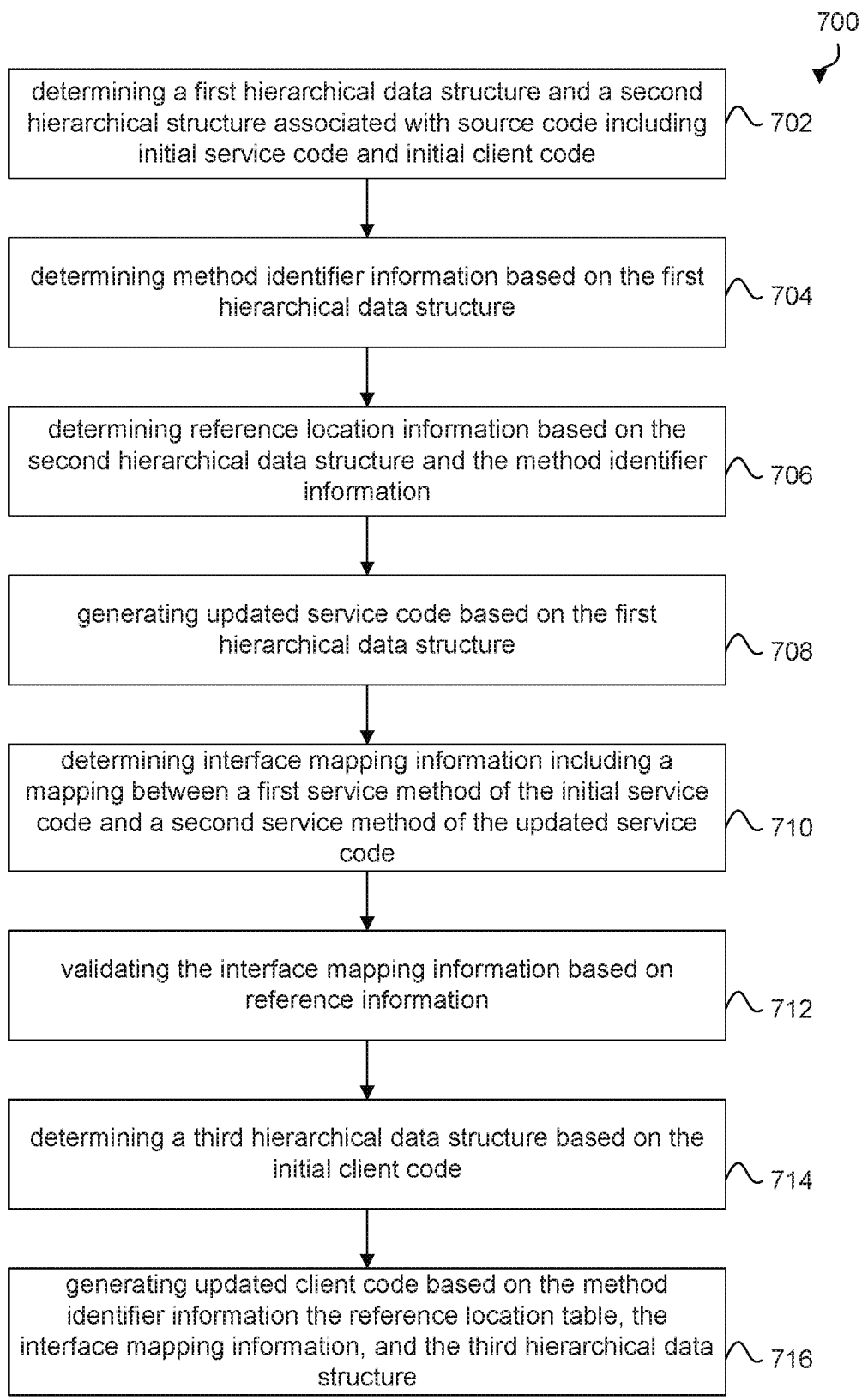
FIG. 7 is a flowchart illustrating a process for semantic-aware and self-corrective automatic re-architecting, according to some embodiments.

FIG. 7 is a flowchart of a method 700 for implementing semantic-aware and self-corrective automatic re-architecting, according to an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIGS. 1, 2, and 4. However, method 700 is not limited to those example embodiments.

In 702, the migration tool may determine a first hierarchical data structure and a second hierarchical structure associated with source code including initial service code and initial client code. For example, the migration tool 200 may be employed to migrate a source code 216 from a first framework 104 to a second framework 106 using a migration tool (e.g., the migration tools 102 and 200). To begin, the syntax parser 202 may generate an abstract syntax tree 224 for the source code 216. In some embodiments, the syntax parser 202 may parse the source code 216 to determine the abstract syntax tree 224. In addition, the syntax parser 202 may generate an abstract syntax tree 226 for the target code 222. The syntax parser 202 may parse the target code 222 to determine the abstract syntax tree 224. Further, as described in detail herein, the target code 222 may be a compilation object resulting from the compilation of the source code 216.

In 704, the migration tool may determine method identifier information based on the first hierarchical data structure. For example, the method identifier 204 may generate the method identifier information 228. In some embodiments, the method identifier information 228 may be a data table. Further, the method identifier information 228 may identify service methods defined in the service code 218 of the source code 216.

In 706, the migration tool may determine reference location information based on the second hierarchical data structure and the method identifier information. For example, the reference searcher 206 may generate the reference location information 230 based on the abstract syntax tree 226 and the method identifier information 228. In some embodiments, the reference searcher 206 may generate the reference location information by traversing the abstract syntax tree 226 and determining location information corresponding to service methods identified in the method identifier information 228.

In 708, the migration tool may generate updated service code based on the first hierarchical data structure. For example, the code generator 208 may generate the updated service code 232 based on the abstract syntax tree 224. In some embodiments, the code generator 208 may identify an initial syntactical element of the abstract syntax tree 224 corresponding to the first framework 104, and replace the initial syntactical element with a new syntactical element associated with the second framework 106 to determine an updated abstract syntax tree 224. For instance, the code generator 208 may replace an initial syntactical element corresponding to the passwordLogin method using the first framework 104 with the new syntactical element corresponding to the biometricLogin method using the second framework 106. Additionally, the code generator 208 may generate updated service code 232 from the updated abstract syntax tree 224. Additionally, or alternatively, as described in detail herein, the code generator 208 may employ custom rules to generate the updated service code 232. In some embodiments, the custom rules may be particular to at least one of the source framework/architecture or destination framework/architecture.

In some embodiments, the code generator 208 may perform environment or exception adaptation when generating the updated service code 232. For example, the semantic analyzer 212 may determine an environment associated with the location of the passwordLogin method within the client code 220. Further, the semantic analyzer 212 may instruct the code modifier 210 to adapt the environment associated with the location of the passwordLogin method generating the updated service code 232.

In some embodiments, the code generator 208 may add a special marker to files including the updated service code 232. For instance, the code generator 208 may add autogenerated comments to the beginning of a file including the updated service code 232. In addition, the comments may indicate that the file is generated and managed by the migration tool 200. Further, in some embodiments, the comments may be used to prevent the migration tool 200 from overwriting files that do not include the auto-generated comments.

In 710, the migration tool may determine interface mapping information including a mapping between a first service method of the initial service code and a second service method of the updated service code. For example, the code generator 208 may generate the interface mapping table 400 while generating the updated service code 232. In some embodiments, the code generator 208 may create a table entry 402 corresponding to the substitution of the biometricLogin method for the passwordLogin within the updated abstract syntax tree 224.

In 712, the migration tool may validate the interface mapping information based on validation information. For example, the interface mapping information 234 may be a first interface mapping table. Further, the migration tool 200 may generate a second interface mapping table using the most recent version of at least one of the configuration information 214, the source code 216, or the target code 222. Further, the migration tool 200 may compare the first interface mapping table to second interface mapping table, and determine if they match. For example, the migration tool 200 may determine whether both the first interface mapping table and the second interface mapping table include a table entry mapping the biometricLogin method to the passwordLogin method. If the interface mapping table to second interface mapping table match, then the first interface mapping table is valid and may be used by the code modifier 210.

In 714, the migration tool may determine a third hierarchical data structure based on the initial client code. For example, the syntax parser 202 may generate an abstract syntax tree 224 for the client code 220. In some embodiments, the syntax parser 202 may parse the client code 220 to determine the abstract syntax tree 224.

In 716, the migration tool may generate updated client code based on the method identifier information, the reference location table, the interface mapping information, and the third hierarchical data structure. For example, the code modifier 210 may determine that the passwordLogin method is an old service call via the method identifier information. Additionally, the code modifier 210 may use the reference location information 230 to distinguish the invocation of the passwordLogin method within the service code 218 from other methods within the service code 218 having a similar name and/or identifier.

Further, the code modifier 210 may determine that biometricLogin is the replacement method within the new framework for passwordLogin within the old framework based on the interface mapping information 234. Additionally, the code modifier 210 may determine an updated abstract syntax tree 224 by replacing an initial syntactical element corresponding to the passwordLogin method with an updated syntactical element corresponding to the biometricLogin method. Once the code modifier 210 has determined the updated syntax tree 224, the code modifier 210 may generate the updated client code 236 based on the updated syntax tree 224.

In some embodiments, the code modifier 210 may perform environment or exception adaptation when generating the updated client code 236. For example, the semantic analyzer 212 may determine an environment associated with the location of the passwordLogin method within the client code 220. Further, the semantic analyzer 212 may instruct the code modifier 210 to adapt the environment associated with the location of the passwordLogin method when replacing the passwordLogin method with the biometricLogin method.

In some embodiments, once the updated client code 220 is generated, the updated client code 220 may be tested, compiled, and/or executed. Further, in some embodiments, the migration tool 200 may perform a generation run or modification run composed of a subset of the steps of method 700.

Figure 8:
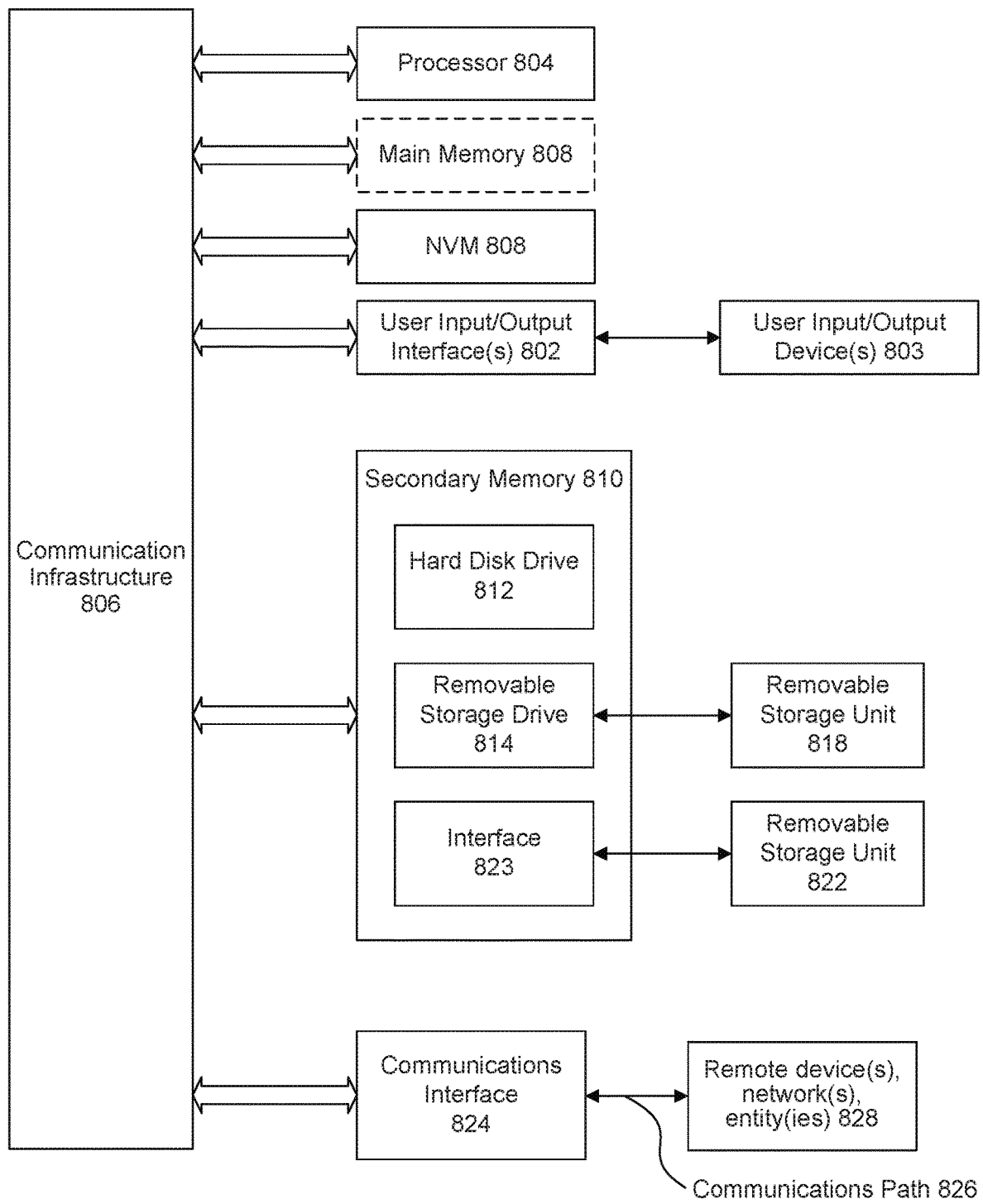
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A non-transitory computer-readable device having instructions stored thereon that, when executed by at least one computing device, causes the at least one computing device to perform operations comprising:
   determining a first hierarchical data structure and a second hierarchical data structure associated with source code including initial service code and initial client code;
   determining method identifier information based on the first hierarchical data structure;
   determining reference location information based on the second hierarchical data structure and the method identifier information;
   generating updated service code based on the first hierarchical data structure;
   determining, by a migration tool, interface mapping information including a mapping between a first service method of the initial service code and a second service method of the updated service code;
   validating whether the interface mapping information corresponds to the source code during a subsequent execution of the migration tool, wherein upon a detection that the interface mapping information is stale, new interface mapping information is generated;
   determining a third hierarchical data structure based on the initial client code; and
   generating updated client code based on the method identifier information, the reference location information, the interface mapping information, and the third hierarchical data structure.

2. The non-transitory computer-readable device of claim 1, the operations further comprising receiving configuration information including a file location of the source code or a file filter.

3. The non-transitory computer-readable device of claim 1, wherein generating the updated client code comprises:
   determining an environment type associated with the first service method within the initial client code; and
   modifying the updated client code based on the environment type.

4. The non-transitory computer-readable device of claim 1, wherein the first hierarchical data structure is an initial abstract syntax tree, and generating the updated service code comprises:
   determining an updated abstract syntax tree by replacing an initial syntactical element of the initial abstract syntax tree with an updated syntactical element; and
   generating the updated service code based on the updated abstract syntax tree.

5. The non-transitory computer-readable device of claim 1, wherein the third hierarchical data structure is an initial abstract syntax tree, and generating the updated client code comprises:
   determining an updated abstract syntax tree by replacing an initial syntactical element of the initial abstract syntax tree corresponding to the first service method with an updated syntactical element corresponding to the second service method; and
   generating the updated client code based on the updated abstract syntax tree.

6. The non-transitory computer-readable device of claim 1, wherein the interface mapping information is first interface mapping information, the validation information is second interface mapping information, and validating the first interface mapping information comprises:
   determining the second interface mapping information; and
   determining that the first interface mapping information matches the second interface mapping information.

7. The non-transitory computer-readable device of claim 1, wherein at least one of the first hierarchical data structure, the second hierarchical data structure, or the third hierarchical data structure is an abstract syntax tree.

8. The non-transitory computer-readable device of claim 1, wherein the generating updated service code comprises:
   identifying a first exception associated with the first hierarchical data structure;
   identifying a second exception associated with the second hierarchical data structure; and
   wrapping the second identified exception within the first exception, wherein the first exception is executable.

9. A method, comprising:
   determining a first hierarchical data structure based on initial service code including an original service method;
   determining a second hierarchical data structure based on target code corresponding to the initial service code;
   determining method identifier information based on the first hierarchical data structure;

determining reference location information identifying an invocation location of the original service method based on the second hierarchical data structure;
generating updated service code based on the first hierarchical data structure;
determining, by a migration tool, interface mapping information including a mapping between the original service method and a new service method based on generating the updated service code;
validating whether the interface mapping information corresponds to the new service method during a subsequent execution of the migration tool, wherein upon a detection that the interface mapping information is stale, new interface mapping information is generated;
determining a third hierarchical data structure based on the initial client code; and
generating updated client code based on the method identifier information, the reference location information, the interface mapping information, and the third hierarchical data structure.

10. The method of claim 9, further comprising:
receiving configuration information including at least one of a location of source code including the initial service code and initial client code, a location of target code, a file filter, or a type of migration run.

11. The method of claim 9, wherein the interface mapping information is a first interface mapping information, and further comprising:
determining a second interface mapping information;
comparing the first interface mapping information to the second interface mapping information; and
validating the first interface mapping information based on the comparing.

12. The method of claim 11, further comprising:
determining method identifier information based on the first hierarchical data structure;
determining the third hierarchical data structure based on initial client code that invokes the original service method; and
generating updated client code based on at least one of the method identifier information, the reference location table, the interface mapping information, or the third hierarchical data structure.

13. The method of claim 12, wherein the third hierarchical data structure is an initial abstract syntax tree, and generating the updated client code comprises:
determining an updated abstract syntax tree by replacing an initial syntactical element corresponding to the original service method with an updated syntactical element corresponding to the new service method; and
generating the updated client code based on the updated abstract syntax tree.

14. The method of claim 12, further comprising:
determining an environment type associated with the original service method within the initial client code; and
generating environment adapted client code based on the updated client code and the environment type.

15. The method of claim 9, wherein the second hierarchical data structure includes an abstract syntax tree, and determining the reference location information (RLT) comprises:
determining the invocation location based on traversing the abstract syntax tree for invocation of the original service method; and determining an RLT entry including the invocation location and an identifier of the original service method.

16. The method of claim 9, wherein the first hierarchical data structure includes an initial abstract syntax tree, and determining the first hierarchical data structure comprises:
parsing the original service code to determine the initial abstract syntax tree, the initial abstract syntax tree including an initial syntactical element corresponding to the original service method.

17. The method of claim 16, wherein generating the updated service code comprises:
determining an updated abstract syntax tree by replacing the initial syntactical element with an updated syntactical element corresponding to the new service method; and
generating the updated service code based on the updated abstract syntax tree.

18. A system comprising:
a memory including source code including initial service code and initial client code; and
one or more processor and/or circuits coupled to the memory and configured to:
determine a first hierarchical data structure and a second hierarchical structure based on the source code;
determine method identifier information based on the first hierarchical data structure;
determine reference location information based on the second hierarchical data structure and the method identifier information;
generate updated service code based on the first hierarchical data structure;
determine, by a migration tool, interface mapping information including a mapping between a first service method of the initial service code and a second service method of the updated service code;
validate whether the interface mapping information corresponds to the source code during a subsequent execution of the migration tool, wherein upon a detection that the interface mapping information is stale, new interface mapping information is generated;
determine a third hierarchical data structure based on the initial client code; and
generate updated client code based on the method identifier information, the reference location information, the interface mapping information, and the third hierarchical data structure.

19. The system of claim 18, wherein the third hierarchical data structure is an initial abstract syntax tree, and to generate the updated client code, the one or more processors and/or circuits are further configured to:
determine an updated abstract syntax tree by replacing an initial syntactical element of the initial abstract syntax tree corresponding to the first service method with an updated syntactical element corresponding to the second service method; and
generate the updated client code based on the updated abstract syntax tree.

20. The system of claim 18, wherein to generate the updated client code, the one or more processors and/or circuits are further configured to:
determine an environment type associated with the first service method within the initial client code; and
determine the updated client code based on the environment type.

* * * * *